US00RE45990E

(19) United States
(12) Reissued Patent
Angelin et al.

(10) Patent Number: US RE45,990 E
(45) Date of Reissued Patent: Apr. 26, 2016

(54) CONVERTER DEVICE

(71) Applicant: OSRAM GmbH, Munich (DE)

(72) Inventors: Francesco Angelin, Mogliano Veneto (IT); Paolo De Anna, Vallà di Riese Pio X (IT)

(73) Assignee: OSRAM GmbH, Munich (DE)

(21) Appl. No.: 14/614,591

(22) Filed: Feb. 5, 2015

Related U.S. Patent Documents

Reissue of:
(64) Patent No.: 8,674,614
Issued: Mar. 18, 2014
Appl. No.: 13/308,566
Filed: Dec. 1, 2011

(30) Foreign Application Priority Data

Dec. 2, 2010 (IT) ..... TO2010A0961

(51) Int. Cl.
*H05B 37/00* (2006.01)

(52) U.S. Cl.
CPC ..... *H05B 37/00* (2013.01)

(58) Field of Classification Search
CPC ..... H05B 37/00
USPC ..... 315/209 R, 127
See application file for complete search history.

(56) References Cited

U.S. PATENT DOCUMENTS 4,058,758 A * 11/1977 Peterson ..... H02H 7/1213 363/21.08
4,524,412 A * 6/1985 Eng ..... H02M 3/3387 323/285
4,743,897 A 5/1988 Perez ..... H05B 33/083 345/212
7,339,323 B2 * 3/2008 Bucur ..... H05B 33/083 315/122
2005/0110469 A1 5/2005 Inaba et al. ..... H02M 3/156 323/222
2007/0012223 A1 * 1/2007 Flusche ..... A45B 3/00 108/26
2007/0013323 A1 1/2007 De Oto
2007/0262724 A1 * 11/2007 Mednik et al. ..... H05B 33/0818 315/125

FOREIGN PATENT DOCUMENTS

WO 2004100614 A1 11/2004
WO 2007088505 A1 8/2007
WO 2009055821 A1 4/2009

* cited by examiner

*Primary Examiner* — Angela M Lie
(74) *Attorney, Agent, or Firm* — Viering, Jentschura & Partner mbB

(57) ABSTRACT

A converter for feeding a load via an inductor with a current having a controlled intensity between a maximum level and a minimum level may include: a switch switchable on and off to permit or prevent, respectively, feeding of current towards said inductor; first and second current sensors sensitive to the current flowing through said switch when said switch is on or off, respectively; comparator circuitry to identify if the current intensity detected by said first current sensor and said second current sensor reaches said maximum level and said minimum level, respectively, by generating respective logical signals; and drive circuitry for said switch sensitive to said logical signals and configured to turn off said switch when the current intensity detected by said first sensor reaches said maximum level and turning on said switch when the current intensity detected by said second current sensor reaches said minimum level.

15 Claims, 6 Drawing Sheets

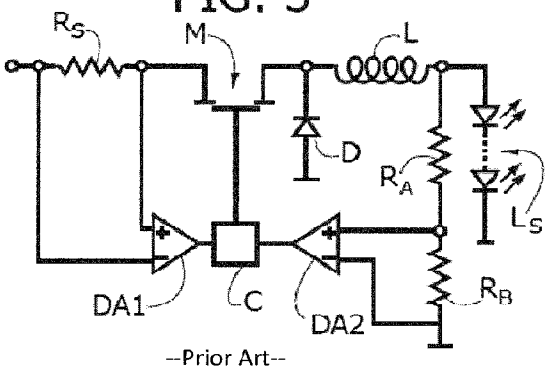
FIG. 1
--Prior Art--
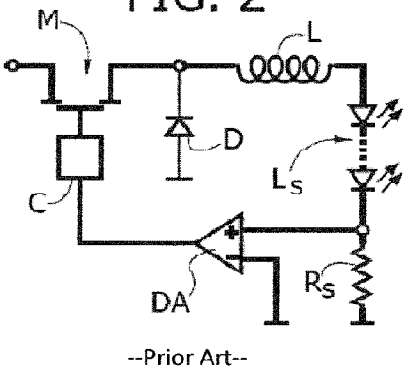
FIG. 2
--Prior Art--
FIG. 3
--Prior Art--
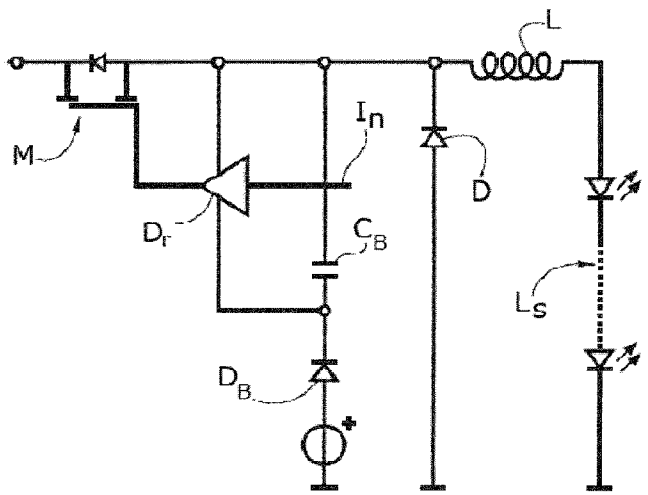
FIG. 4
--Prior Art--
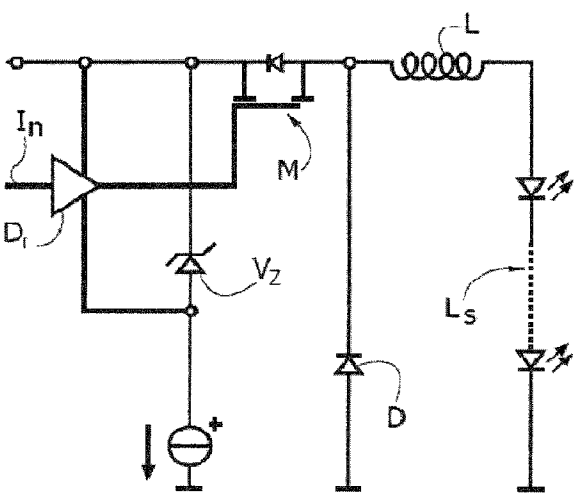
FIG. 5
--Prior Art--

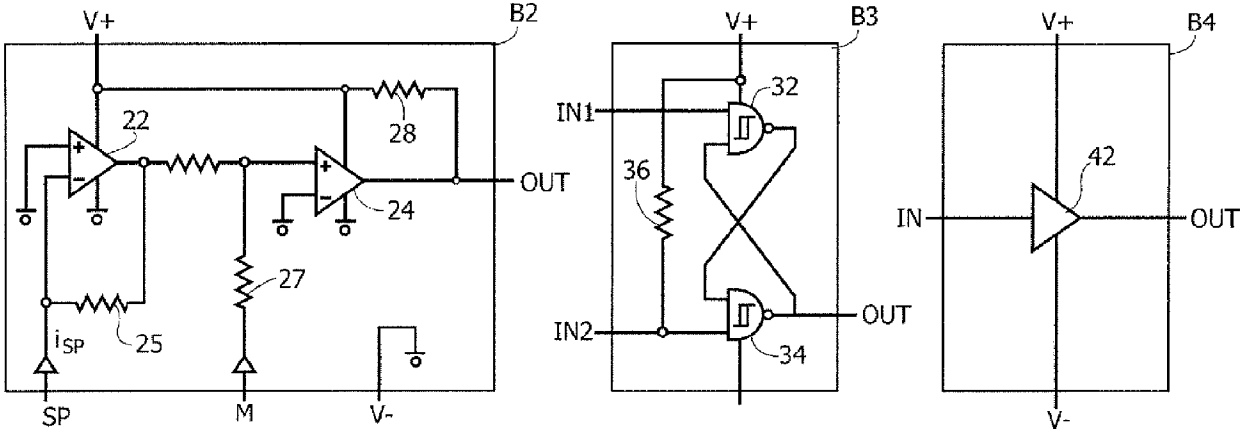
FIG. 7
FIG. 8
FIG. 9
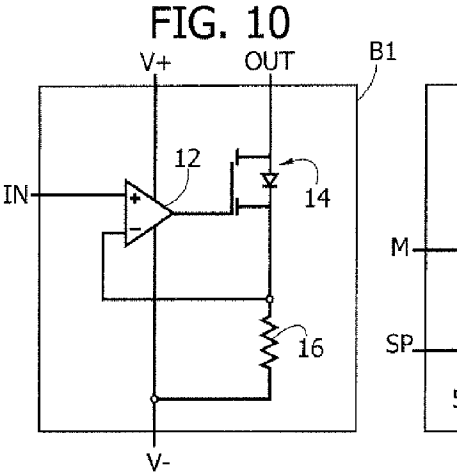
FIG. 10
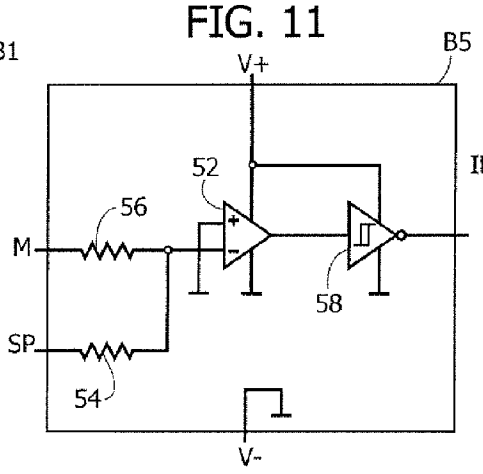
FIG. 11
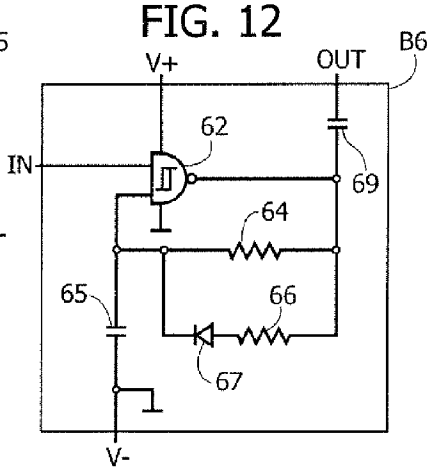
FIG. 12

CONVERTER DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

The present application *is a reissue application of U.S. Pat. No. 8,674,614, issued Mar. 18, 2014, and which* claims priority from Italian application No. [TO2010A00061] *TO2010A000961* filed on Dec. 2, 2010, the entire contents of which are incorporated herein by reference.

TECHNICAL FIELD

Various embodiments relate to converters, for example for supplying loads such as light sources, e.g. LEDs.

BACKGROUND

In such a context as previously outlined, various solutions may make use of the well-known design of a "buck" converter (i.e., wherein a current is supplied to a load via an inductor), possibly without an output capacitor and/or with a constant-current control strategy, instead of a typical constant-voltage control strategy, whereby here by a "constant" current we mean an "average constant" current, i.e. a current which oscillates and is always included within two limit values, so that the average value in time is constant.

FIGS. 1 and 3 show various solutions that can be resorted to in order to achieve a control function of the above mentioned kind, and FIGS. 4 and 5 show various ways to drive a switch or an electronic switch, such as a mosfet.

In all Figures, load $L_S$ fed from the converter can include for instance a light source, for example a light source including one or several LEDs, possibly forming a so called "LED string".

In such an application, it is possible to achieve an adjustment of the average brightness and/or of the average colour (if LEDs with different colour spectres are used) through short circuiting the whole string or part of it by static means, or else by a PWM (Pulse Width Modulation) technique. In this particular design, the converter is required to be adapted to maintain current regulation with good accuracy, in spite of the voltage variations brought about by the modulating circuit (dimming): see for example U.S. Pat. Nos. 4,743,897, 7,339,323 or US2007/0262724 A1.

In FIGS. 1 to 3, reference DA denotes in general an operational amplifier, typically structured as differential amplifier (in the case of FIG. 3, two such amplifiers are present, respectively DA1 and DA2), while references L, D and $R_S$, possibly followed by other suffixes, indicate in general an inductor, a diode and a resistor.

When it is used as a derivative resistor or shunt, resistor $R_S$ can be connected in series with load $L_S$, or else with one of the switches responsible for switching (i.e. an electronic switch including a mosfet or a diode).

Specifically, in the diagram of FIG. 1, shunt resistor $R_S$ is connected in series between output inductor L and load $L_S$. The current on the load is detected throughout the switching period of differential amplifier DA, which detects the voltage across resistor $R_S$ and drives a control module C correspondingly. This in turn drives main switch M (for example a mosfet) adapted to modulate the power supply towards load $L_S$.

The arrangement in FIG. 1 is a good solution in case of decreased or slow output voltage variations, taking into account the performance limitations of amplifier DA in terms of dv/dt. The arrangement of FIG. 1 may be prone to common mode errors, which can jeopardize overall performance and limit the width of output voltage.

In the diagram of FIG. 2, where elements or components identical or equivalent to parts or components already described are denoted by the same references, shunt resistor $R_S$ is connected to the return from load to ground. Once again, current is detected throughout the switching period. In this case, amplifier DA is ground referenced (and therefore there is no problem due to common mode errors), but load $L_S$ cannot be connected directly to ground, which may be a serious problem in such applications which require the use of several strings (multi-string), wherein it is paramount to have a common return.

As has already been stated, the diagram in FIG. 3 includes two amplifiers, the first of which, DA1, senses the voltage drop across a shunt resistor $R_S$ connected in the input line, while the second, DA2, senses the drop across a resistor $R_B$ inserted, for example, into a voltage divider $R_A$, $R_B$ connected in parallel to load $L_S$. The control action on switch M is therefore carried out as a function of the output signals of both amplifiers DA1 and DA2. In this case, current is sensed only during the on-time of electronic switch M, by using and input side shunt (i.e. resistor $R_S$) connected in series to switch M. Common mode errors of amplifier DA1 are reduced by static operation at a known and constant voltage.

The lack of current sensing during the off-time of switch M requires resorting to a slightly different control technique, while considering the off-time as inversely proportional to the output voltage. This therefore requires voltage sensing via divider $R_A$, $R_B$, together with a programmable timer for the off-time. The achievable accuracy is limited because of the indirect current evaluation process.

Another aspect to be accounted for is the nature of the main switch, which can include a mosfet transistor.

Two choices are possible in this case, N-type or P-type.

N-type is faster, less expensive and less dissipative than P-type; furthermore, the gate charge is much lower. N-type, however, requires a gate voltage which is higher than source voltage, and therefore higher than input voltage, which is usually the highest voltage in the circuit.

This calls for some kind of voltage booster, adapted to consist of a charge pump circuit. Moreover, the mosfet source terminal is floating, so a floating driver is also needed.

A P-type mosfet uses a gate drive voltage which is lower than source, and the source terminal itself is connected to a stable point, which simplifies the operation of the driver.

As a reference, the diagram in FIG. 4, where once again references already used in the previous Figures denote identical or equivalent components (with the addition, in this case, of a capacitor $C_B$ and a further diode $D_B$), shows the presence of a bootstrap circuit, which powers a driver $D_r$ driving the gate of mosfet M (in this case of the N-type). The bootstrap circuit includes a diode $D_B$ and a capacitor $C_B$, which are connected to the output of switch M. In this case, the auxiliary supply of driver $D_r$ only operates when switch M is periodically switched, and therefore no static bias can be provided to the gate.

The diagram in FIG. 5 shows the use, as switch M, of a P-type mosfet; in this case, it is possible to supply driver $D_r$, driving the gate of mosfet M, via a dissipative current generator.

SUMMARY

Various embodiments provide a converter having the features specifically set forth in the claims that follow.

The claims are an integral part of the technical teaching of the invention provided herein.

In accordance with some embodiments, a converter for feeding a load via an inductor with a current having a controlled intensity between a maximum level and a minimum level is provided, the converter including: a switch switchable on and off to permit or prevent, respectively, feeding of current towards said inductor; a first current sensor sensitive to the current flowing through said switch when said switch is on; a second current sensor sensitive to the current flowing through said inductor when said switch is off; comparator circuitry to identify if the current intensity detected by said first current sensor and said second current sensor reaches said maximum level and said minimum level, respectively, by generating respective logical signals, and drive circuitry for said switch sensitive to said logical signals and configured to turn off said switch when the current intensity detected by said first sensor reaches said maximum level and turning on said switch when the current intensity detected by said second current sensor reaches said minimum level.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which FIGS. 1 to 5 show conventional converter circuits, FIGS. 7 to 12 show the structure of some blocks of an embodiment.

DETAILED DESCRIPTION

Figure 6:
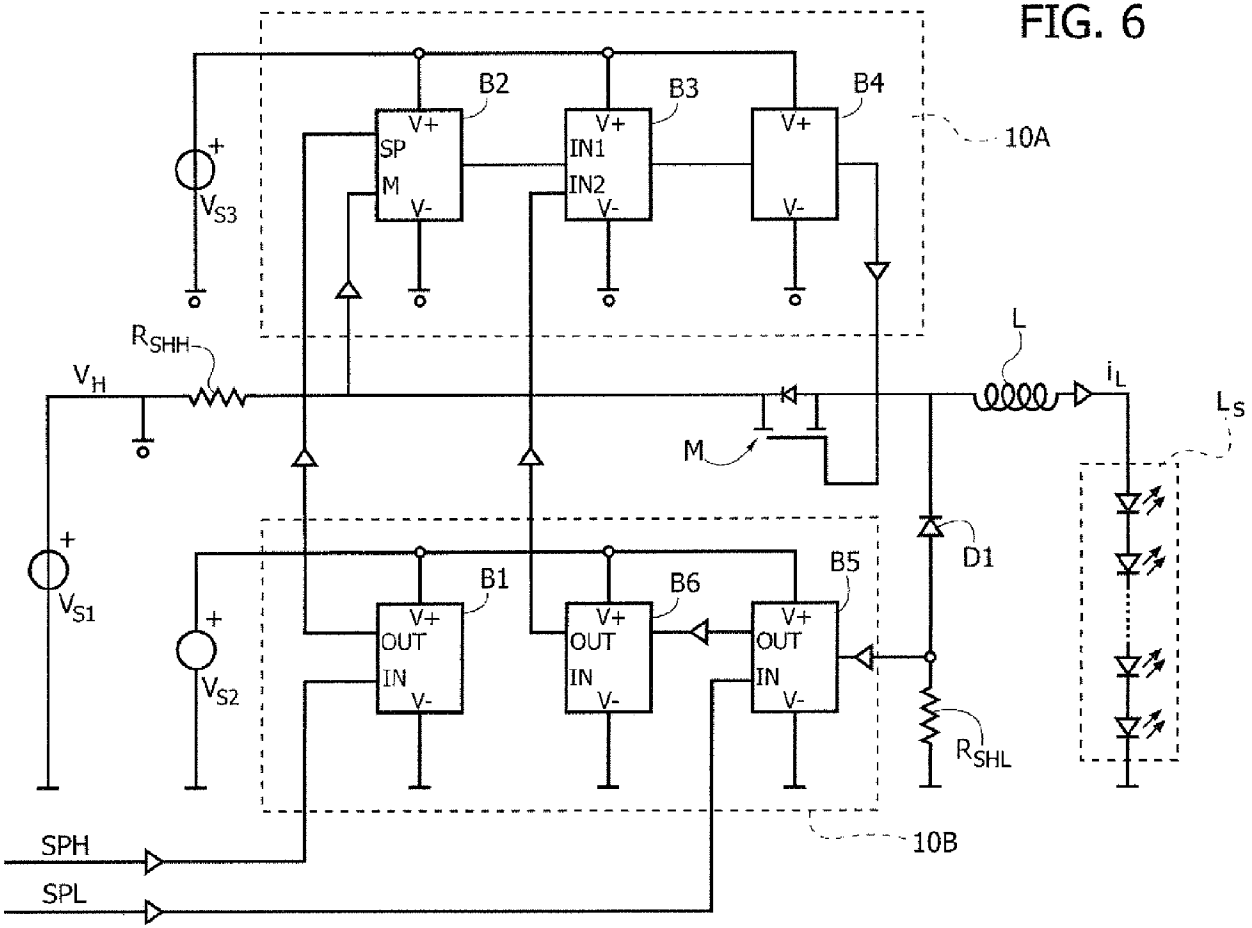
FIG. 6 is a block diagram of an embodiment.

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

One aspect of various embodiments may be seen in that the inventors have noted that the various solutions described with reference to FIGS. 1 to 5 (and any other solution making use of the same fundamentals) show both advantages and disadvantages.

Another aspect of various embodiments may be seen in that the inventors have moreover noted that a control strategy based on the average current is not advisable if fast and wide variations of the output voltage are present, because of the time delay inherent in the control technique itself.

It would be desirable, therefore, to have a solution that ideally benefits from the advantages of all previously described techniques, while avoiding the related disadvantages, specifically as concerns the following features:

- possibility to return or "close" load $L_S$, for example a string of LEDs, directly to ground, without the need of adding components such as a resistor; as previously stated, this advantage is particularly useful when several LED strings are used for which a common return is needed;
- possibility to use, as main switch M, an N-type mosfet, with the consequent advantages (higher speed, lower cost, lower dissipation and lower gate charge than in P-type),
- possibility to sustain a 100% duty cycle, i.e. an ideally static mosfet turn-on, thanks to the availability of an auxiliary power supply which can be derived, for example, from an auxiliary winding of an isolation transformer, normally placed upstream a converter as the one considered herein, or through a charge pump circuit;
- high accuracy in the evaluation of average current, for example thanks to a direct measurement of the peak current, which can be obtained by two shunts, i.e., in general, the possibility to base the operation on the real value of the peak current, and
- possibility to use control signals (set-point) with a common ground reference, which enables for example their connection to a low voltage control "intelligence".

Various embodiments described herein provide a solution to the previously outlined needs.

Specifically, an aspect of various embodiments may be seen in that the inventors have observed that in a high-dynamic current regulation for a buck converter it is possible to adopt a hysteresis control strategy, involving some kind of load current measurement, for example via two shunt resistors.

In such an architecture, it is possible to cause the switch or main switch to close each time that the load current decreases below a certain low-set-point (SPL), and on the contrary to open when the load current goes above a certain high-set-point (SPH).

This behaviour intrinsically involves a continuous conduction mode (CCM), with an average current $I_{AV}$ linked to the value of (SPH+SPL)/2, while the difference SPH-SPL corresponds to the current ripple, i.e. the "hysteresis" of the converter.

In various embodiments, the description may refer to non-isolated switching converters.

In various embodiments, the description may refer to a generator of "constant" current (as has been outlined in the introduction of the present disclosure, i.e. an average constant current, always oscillating and contained within two limit values, so that the average value is constant in time) with a very high voltage dynamic, i.e. wherein the output current of the DC/DC converter delivered to the load remains stable in spite of large variations of the load voltage, so that the converter is an almost ideal current generator.

In various embodiments, the description may apply to light sources, for example LEDs.

In the diagram of FIG. 6, reference 10 denotes on the whole a converter adapted to drive, in various embodiments, a load $L_S$ including or consisting for example of one or several LED light sources.

In various embodiments, load $L_S$ can include or consist of one or several LED strings.

Supply starts from a source that, in various embodiments, is configurable as a voltage source VS1, connected to load $L_S$ via a switch M and a filter, including or consisting of an inductor. In various embodiments, switch M can be an electronic switch, for example a mosfet. In various embodiments, switch M can be an N-type mosfet.

In the embodiments referred to in the diagram of FIG. 6, connection between source VS1 and switch M goes through a resistor $R_{SHH}$, and connection between switch M and load $L_S$ goes through an inductor L.

In the presently considered exemplary embodiments, a diode D1 is connected with its cathode interposed between switch M and inductor L, and with its anode connected to a further resistor $R_{SHL}$, whose end opposed to diode D1 is connected to ground.

References SPH and SPL denote, as will be more fully explained in the following, two reference signals which are adapted to define the high-set-point and the low-set-point of the possible variation range of current $i_L$ in inductor L and in load $L_S$.

For various embodiments, the diagram in FIG. 6 exemplifies therefore a converter enabling the supply a load $L_S$, via an inductor L, with a current $i_L$ of controlled intensity, included between a maximum and a minimum level identified by signals SPH and SPL.

Switch M can be turned on and off selectively, in order to enable or to prevent, respectively, the power supply from source VS1 towards inductor L.

Shunt resistor $R_{SHH}$ is a first current sensor, sensitive to the current flowing through switch M when that switch is on (i.e. conductive).

Shunt resistor $R_{SHL}$ is a second current sensor, sensitive to the current flowing towards load $L_S$ through inductor L when switch M is off (i.e., non conductive), and diode D1 is closed to recirculate the current in inductor L.

References VS2 and VS3 denote two auxiliary generators, the function whereof will be more clearly defined in the following. Generators VS2 and VS3 can be designed according to criteria known in the art, so that they do not require a detailed description herein.

In various embodiments, converter 10 is split into two sections, that is a high side or section 10A, and a low side or section 10B.

The high side or section 10A is tied to line $V_H$, that connects source VS1 to load $L_S$ (that is, in practice, the common return for all circuits on the high side 10A), and is provided with its own power supply VS3. The high side or section 10A is adapted to sense current $i_L$ that flows through switch M (i.e. through load $L_S$) when switch M itself is closed ("on"). This takes place through cooperation with shunt resistor $R_{SHH}$ which, in the presently considered embodiment, is connected in series with the N-type mosfet drain, of which switch M consists. The high side or section 10A includes three blocks, denoted by B2, B3 and B4, which will be described in greater detail with reference to FIGS. 7 to 9.

The low side or section 10B is on the contrary tied to the common ground (i.e. the load return) and to references SPH and SPL, with its own power supply VS2. The low side or section 10B is adapted to sense current $i_L$ flowing through inductor L (i.e. through load $L_S$) when switch M is open ("off") and diode D1 is closed, i.e. conductive. This takes place through the second shunt resistor $R_{SHL}$. The low side or section 10B includes blocks B1, B5 and B6, which will be described as well in greater detail with reference to FIGS. 10 to 12.

In various embodiments, the plural blocks B1 to B6 can be defined, as for the function they perform, as follows:

B1: level shifter,

B2: high side current comparator,

B3: main control logic,

B4: driving unit of switch M (of the mosfet gate, in the presently considered example), B5: low side current comparator, and B6: pulse former and level shifter.

The reference to these general functional elements highlights the fact that the present description is in no way limited to the specific embodiments described in the following: those skilled in the art will readily realize equivalent processing functions by resorting to different circuit architectures. Therefore, in the following, various possible embodiments of functional block B4 will be described.

Those skilled in the art will moreover appreciate that various aspects of the functions and/or of the processing circuits described in the following are not compulsory in order to implement the embodiments.

Starting from block B1, a comparative examination of FIGS. 6 and 10 shows that input IN of that block includes the high reference signal SPH that undergoes, in the presently considered embodiment, a simple voltage-to-current conversion, via an operational amplifier 12. Amplifier 12 receives signal SPH at its non inverting input, and drives a mosfet 14 adapted to generate an output current signal OUT, sent towards block B2 (refer to FIG. 6), for example with a resistor 16 determining the relationship between input voltage IN and output current OUT.

Block B2 (referring jointly to FIGS. 6 and 7) receives at the input denoted as SP (set point) the reference value corresponding to level SPH, converted into current by block B1, and processes it on the basis of a measurement signal M which represents the value of current $i_L$ (this value can be inferred for example on the basis of the voltage drop across shunt resistor $R_{SHH}$). The output signal from block B2, denoted OUT, is essentially a logic level, which signals that current $i_L$ in the load has reached the upper level identified on the basis of level SPH. In practice, when the current in the load reaches the (upper) level SPH, block B2 can supply a corresponding signal IN1 to logic block B3, which will be detailed in the following.

In the presently considered exemplary embodiment, block B2 essentially includes or consists of an operational amplifier 22, and serves as a set-point recovery circuit by working substantially as a current/voltage converter. In the presently considered embodiment, moreover, there is also provided a comparator 24, that senses the output of amplifier 22 and asserts a given logic level ("low", in the presently considered example) when the load current reaches the level identified by SPH.

References 25, 26, 27 and 28 identify the resistors associated to the above-mentioned components 22 and 24, in order to perform said function. The connection criteria of such resistors are well known and can be chosen on the basis of the sought purpose, and therefore they do not require a detailed description herein.

Before describing blocks B3 and B4, for simplicity block B5 is to be described. The latter is adapted to perform, on the low side, a similar function to the one performed by block B2 on the high side.

Therefore, block B5 receives, at input SP (see jointly FIGS. 6 and 11), the reference signal or low set point identified by SPL.

Input M towards block B5 is simply a signal representing load current $i_L$, measured on the "low" side, for example by sensing the voltage drop across shunt resistor $R_{SHL}$.

Output OUT from block B5, adapted to be issued towards block B6, is a logic signal adapted to signal, to logic block B3 (through block B6, in the presently considered example), the fact that the current has reached the low threshold level, identified by SPL.

In the presently considered example, block B5 includes a comparator 52, having its non-inverting input connected to ground, and whose inverting input serves as a summing point, adapted to receive, respectively through a resistor 54 and through a resistor 56, the signal at input SP (i.e. the low threshold level, identified by SPL), and a signal stating the measured current (signal M, generated from shunt resistor $R_{SHL}$). In the presently considered embodiment, the output of comparator 52 is connected to a logic inverter 58, adapted to generate the output signal of block B5, denoted by OUT.

This signal is brought to the input of block B6 (see FIGS. 6 and 12 jointly), the function whereof is to receive the logic level coming from the current comparator on the low side B5, in order to generate a signal IN2 for logic block B3, which is compatible with this logic block being on the high side of converter 10. In the presently considered example, block B6 is substantially comparable, for the presence of element which will be described in the following, to a derivative network with a start-up circuit, made up by a retriggerable astable oscillator.

Specifically, reference 62 denotes a logic gate NAND which receives at one input IN the output signal from block B5, and at the other input the signal of a feedback network substantially similar to an RC circuit (resistor 64 and capacitor 65), wherein resistor 64 is connected in parallel with a series connection of a resistor 65 and a diode 67, with the cathode turned towards condenser 65 and gate 62. Moreover, the gate output 62 is connected to the respective output, which is sent to block B3 through a condenser 69.

The circuit operates by generating an output pulse OUT every time one of them arrives at input IN, or when a certain time elapses from the arrival thereof or from the last one having been sent to the output, so as to enable the start or a new start of the cyclic operation (see below).

Referring now to the logic block B3, in the presently considered and merely exemplary embodiment it is a logical latch circuit with active-low inputs.

In the presently considered, merely exemplary embodiment, it is essentially a bistable logic circuit, built around two logic gates NAND 32, 34, each of which receives, at an input, one of the signals IN1 and IN2 respectively coming from the high-side comparator B2 and from the low-side current comparator B5 (through block B6) and, at the other input, the output of the corresponding gate (i.e., the output of gate 34 for gate 32, and the output of gate 32 for gate 34). Reference 36 denotes a biasing resistor.

An output of block B3 (in the presently considered embodiments, output 34) can be used to drive switch M through block B4, together with the logic function of closing the switch when a signal arrives from B6, and to open it again when it arrives from B2.

By considering what has previously been stated, the logic signals IN1 and IN2 provided to block B3 from blocks B2 and B5 indicate that the current level has reached one of the limits of the possible variation range, i.e.:

- the upper limit level, identified by signal SHP—block B2, or else
- the lower limit level, identified by signal SPL—block B5.

For example, when the current reaches the level of high set-point (SPH), the output of block B3 goes to a level corresponding to the switching off or opening of switch M, so as to interrupt the current flowing towards inductor L.

On the contrary, if the current reaches the level of low set-point (SPL), the output of block B3 goes to a level corresponding to the switching on or closing of switch M, so as to re-establish the flow of current towards inductor L.

In various embodiments, block B3 can also perform other functions, for example an enable/disable function, system start-up management, auxiliary protection. Some of the functions of block B3 may in case be shared with block B6, or transferred to such block, so as to have a common ground for auxiliary signals.

Block B4 (of which, as has been done previously for all presently considered blocks B1 to B6, only possible exemplary embodiments will be described) has essentially the function of driving switch M.

For example, if switch M is a mosfet, for example an N-type mosfet, block B4 can convert the logical level generated at output OUT of block B3 into an actual drive signal for the mosfet gate. This may involve for instance the functions of level shifting and/or current or voltage amplification, so as to ensure driving of the switch M in the desired conditions.

In one possible embodiment, circuit B4 can include or consist of a simple buffer/amplifier 42, supplied for example by high-side source VS3, at least in static conditions or during circuit start-up.

Figure 13:
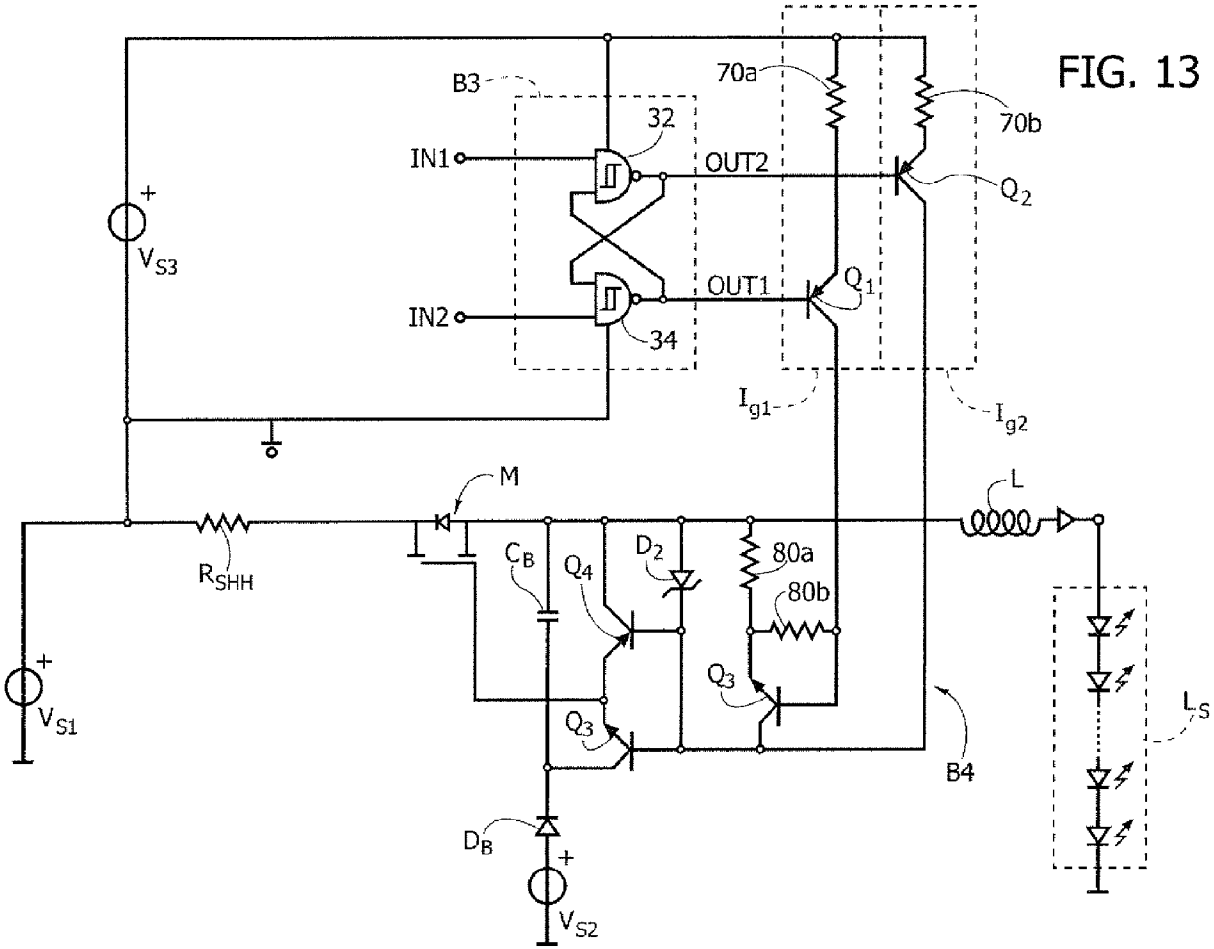
FIGS. 13 and 14 show possible modifications of blocks in embodiments.

FIG. 13 shows possible implementations, in various embodiments, of the driving of switch M starting from block B3.

As for this point, it is to be noted that:

- in FIG. 13, parts or elements which have already been described in the foregoing are denoted by the same references, so as to make it unnecessary to repeat the description of such parts or elements;
- for clarity and simplicity of illustration, the diagram of FIG. 13 only shows, from the general diagram of FIG. 6, those elements that are meaningful for the following description.

According to the solution shown in FIG. 13, the drive circuit for switch M can be implemented by resorting to two current generators Ig1 and Ig2, each of them preferably including or consisting of a BJT PNP transistor Q1, Q2 and of a resistor 70a, 70b, which establishes the fed current. The generators are triggered one at a time, respectively to switch the mosfet off or on. Both generators Ig1 and Ig2 are triggered by complementary outputs OUT1 and OUT2 of block B3. Generator Ig1 is in charge of switching the mosfet off, and includes or consists of Q1 and resistor 70a; generator Ig2, on the contrary, switches the mosfet on, through Q2 and 70b.

Both current generators Ig1 and Ig2 are constrained to voltage Vs3, i.e. a higher voltage than main supply voltage Vs1, therefore being adapted to trigger the N-type mosfet.

In the illustrated embodiment, between both current generators Ig1 and Ig2 and switch Q1 there are further:

- a first common emitter inverting amplifier (transistor Q3 with related resistors 80a and 80b), which amplifies the current of Ig1, and a complementary pair of transistors Q4 and Q5, which constitute a current amplifier or buffer (also known as complementary emitter tracker) driving the mosfet gate.

The group Q3, Q4, Q5 is linked to the source of mosfet M, and therefore it is "floating", i.e. without a stable reference.

In the illustrated embodiment, there are moreover present:

a zener diode Dz, adapted to limit the gate voltage of switch M, so as to protect the mosfet from damage, and a bootstrap circuit, including or consisting of a capacitor Cb and a diode Db, connected to the lower auxiliary supply $V_{s2}$, and adapted to supply the buffer when the mosfet is switched.

The above described circuit (various components whereof, it will be noted, may in various embodiments be dispensed with, or replaced with equivalent components) operates as follows.

When a low active signal gets at IN1 (B3), signal OUT1 switches on the current generator Ig1 which, through the collector of Q1, sends a current to Q3; this current is amplified by Q3 and then by buffer Q4. The effect consists of the discharge of the gate charge of mosfet M at its very source, and therefore opens it.

The voltage at mosfet source then goes down very rapidly to ground; the amplifier unit Q3, Q4, Q5 undergoes the same decrease together with the collector of Q1, which however keeps on providing the switch-off current. In this stage, Q2 is open and does not generate any collector current.

When a low active signal gets at IN2, Ig2 is triggered by OUT2, so as to supply a current directly into buffer Q5, which amplifies this current via the energy stored in Cb, and turns the mosfet on. At this stage Q1, Q3 and Q4 are inactive.

Transistor Q5 can get energy from Cb, because the mosfet is periodically switched, so as to recharge Cb at each cycle through diode Db from source Vs2 (actually, this circuit is called "bootstrap").

When capacitor Cb is discharged, the very current coming from Q2, while flowing through the direct base-emitter junction at Q5, charges the mosfet gate and turns it on.

This operation guarantees the static working of the driver circuit, and enables start-up of the bootstrap circuit. In order to avoid excessive dissipation in a periodic switching mode, in various embodiments it can be supported by the bootstrap circuit itself.

Figure 14:
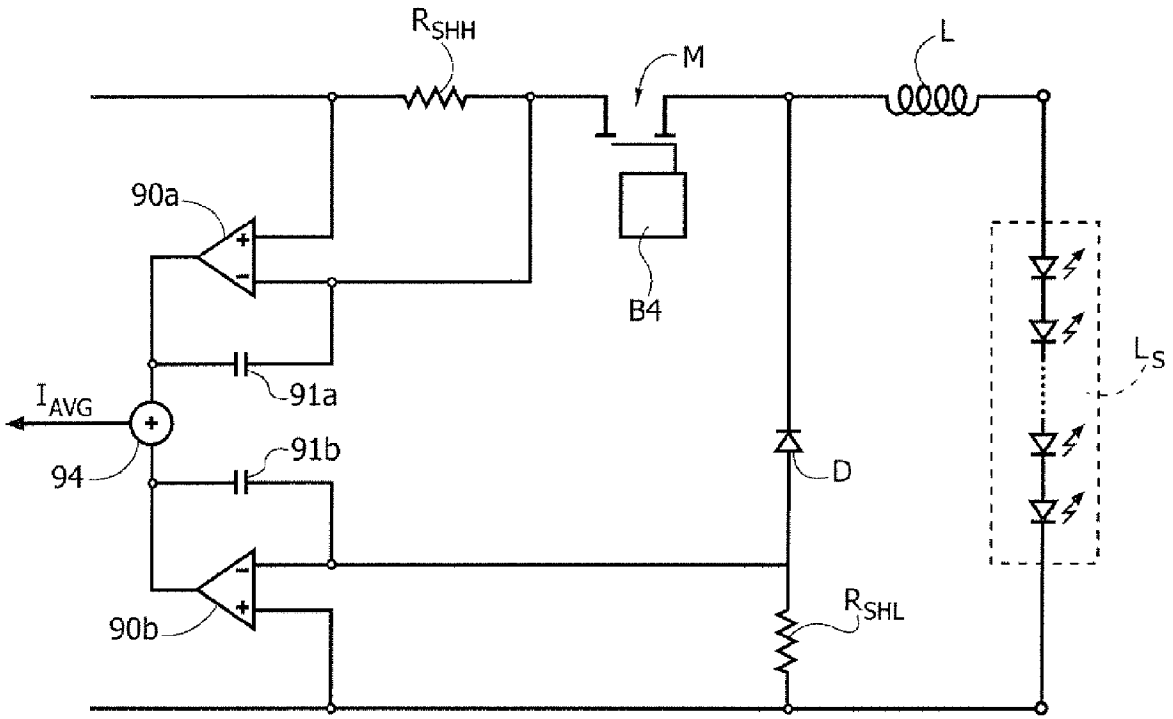
Figure 15:
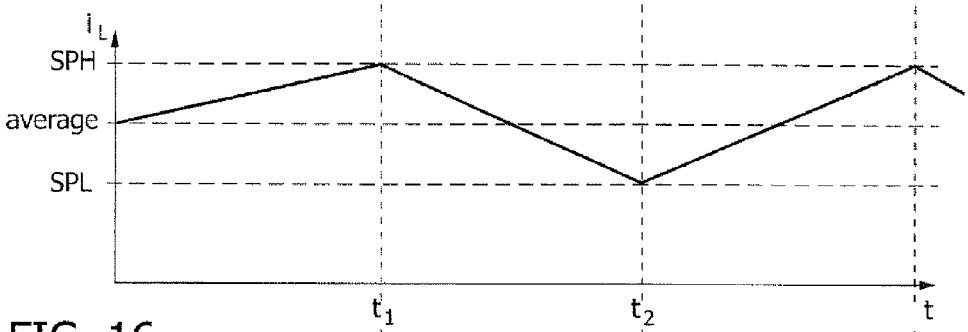
FIGS. 15 to 18 show the behaviour of some signals during operation of an embodiment.

FIG. 14 shows that, in various embodiments, it may be useful to have an analog signal expressing the value of average current to the load.

Once again:

in FIG. 14, parts or elements previously described are denoted by the same references already used before, and therefore the description thereof will be omitted;

for clarity and simplicity of illustration, the diagram in FIG. 14 shows, from the general diagram in FIG. 6, only the elements which are of interest for the description that follows.

In the specific topology shown, it is possible to obtain a signal representative of the value of the average current to the load by simply summing the average current values obtained by each shunt ($R_{SHH}$ e $R_{SHL}$).

In the diagram shown for exemplary purposes in FIG. 14 there is depicted a possible solution, wherein a differential amplifier 90a obtains the current mean value for the high side of the circuit; the presence of a capacitor 91a expresses the integrating feature of the amplifier: i.e., the output is the average value of the input differential signal.

One further differential amplifier 90b obtains the average current value for the low part of the circuit; the presence of a capacitor 91b expresses an integrating feature of the amplifier, i.e. the output is the mean value of the differential input signal, which can be used for various functions, possibly associated with the described circuit.

There is also provided a block 94, which performs the sum of both obtained signals in order to yield the value of the average current on the load.

The operation is based on the fact that the integral of the sum of the currents (which equals the current supplied to the load) corresponds to the sum of the integrals (i.e. of the single components respectively yielded by 90a and 90b).

FIGS. 15 to 18 are chronograms referring to a common time scale, and adapted to show the conditions of switching on or closing ("on") or else of switching off or opening ("off") of switch M, as a function of the current behaviour in load $i_L$ (FIG. 15), which varies around an average value between a maximum and a minimum level, represented by levels SPH and SPL.

Figure 16:
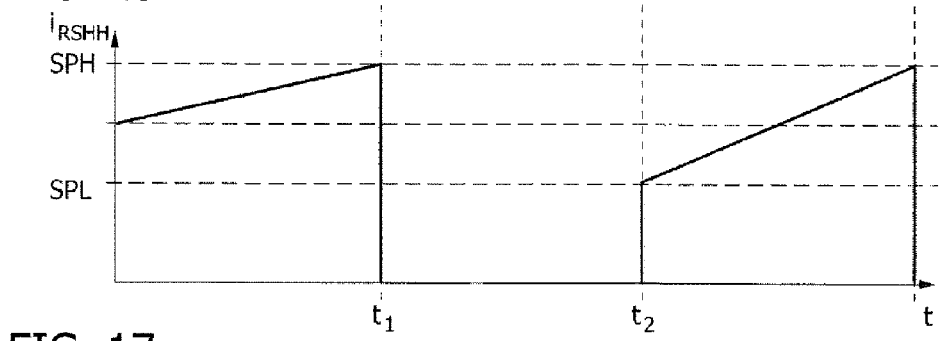
Figure 17:
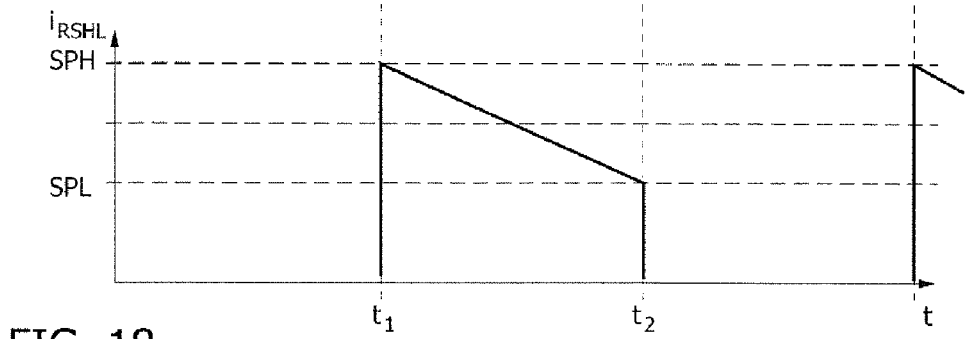
Figure 18:
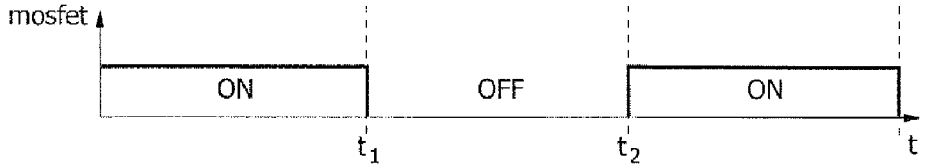

The diagrams in FIGS. 16 and 17 show the corresponding current behaviour across the high-side shunt resistors $R_{SHH}$ (FIG. 16) and across the low-side shunt resistor $R_{SHL}$ (FIG. 17).

FIGS. 15 to 18 refer to a possible operation of embodiments, wherein a steady state is assumed with a constant output voltage which is lower than input voltage, and assuming to start from an initial condition wherein switch M is closed, i.e. conductive.

In these conditions, current flowing towards load $L_S$ via inductor L increases with a corresponding behaviour, which is mirrored by the voltage that can be sensed across shunt resistor $R_{SHH}$ (FIG. 16).

It is assumed that at time t1 the current has reached the maximum level, identified by signal SPH. This event is sensed by block B2, which acts upon block B3 (signal IN1), so that the latter opens switch M via block B4.

In these conditions (i.e, at the opening of switch M), the current in the drain net (and therefore also the current through shunt resistor $R_{SHH}$) goes to zero, while diode D1, which acts as a freewheeling diode, starts conducting, so that the shunt resistor on the low side $R_{SHL}$ is traversed by the same current $i_L$ that flows in the load $L_S$ via inductor L.

Now, the output current starts to decrease until, at time t2, it reaches the lower level, identified by signal SPL. This event is identified by block B5, which acts on block B3 (signal IN2), so that the latter, once again via block B4, triggers switch M again. As a consequence, the current through low shunt resistor $R_{SHL}$ drops to zero, and diode D1 opens.

Now the cycle starts again, with a new increase of the current across inductor L.

In case the output current does not reach the upper value, identified by level SPL, in various embodiments switch M can be driven so that it stays on indefinitely.

Of course, without prejudice to the underlying principle of the invention, the details and the embodiments may vary, even appreciably, with respect to what has been described by way of example only, without departing from the scope of the invention as defined by the annexed claims. For example, in various embodiments, diode D1 can be substituted, in its function of "automatic" switch which, while switch M is switched off, lets resistor $R_{SHL}$ be traversed by the current flowing via said inductor L, with a second controlled switch, specifically according to criteria which complement those adopted for main switch M. All this takes place on the basis of criteria known in themselves (so called synchronous rectification).

In accordance with various embodiments, a converter is provided for feeding a load via an inductor with a current having a controlled intensity between a maximum level and a minimum level, the converter including: a switch switchable on and off to permit or prevent, respectively, feeding of current towards said inductor; a first current sensor sensitive to the current flowing through said switch when said switch is on; a second current sensor sensitive to the current flowing through said inductor when said switch is off; comparator circuitry to identify if the current intensity detected by said first current sensor and said second current sensor reaches said maximum level and said minimum level, respectively, by generating respective logical signals; and drive circuitry for said switch sensitive to said logical signals and configured to turn off said switch when the current intensity detected by said first sensor reaches said maximum level and turning on said switch when the current intensity detected by said second current sensor reaches said minimum level.

In accordance with some embodiments, said switch may be an electronic switch, such as a mosfet, preferably of the N type.

In accordance with some embodiments, said first sensor may include a resistor traversed by the current flowing through said switch.

In accordance with some embodiments, said second sensor may include a resistor coupled to the converter output, and a further switch may be interposed between said switch and said resistor coupled to the converter output, said further switch conductive when said switch is turned off, whereby, with said switch turned off, said resistor coupled to the converter output is traversed by the current flowing through said inductor.

In accordance with some embodiments, the converter may include a high level comparator coupled to said first current sensor and having an input coupled with a level shifter, preferably in the form of a voltage/current converter, to shift the level of an input signal to the converter representative of said maximum current level.

In accordance with some embodiments, the converter may include a low level comparator coupled to said second current sensor having its output coupled with a pulse former, preferably in the form of a derivative network, to generate as an output said respective logic level to feed to said drive circuitry.

In accordance with some embodiments, the converter may include a logical circuit sensitive to said respective logical signals to generate at least one resulting logical output signal, a drive circuit to generate, starting from said at least one resulting logical output signal, a drive signal for said switch.

In accordance with some embodiments, said drive circuit may include: a pair of current generators alternatively activated by said at least one resulting logical output signal, to turn said switch on and off, respectively, and current amplifier or buffer driven by said current generators and in turn driving said switch.

In accordance with some embodiments, said current generators may drive said current amplifier or buffer via an intermediate amplifier which amplifies the current of one of said current generators.

In accordance with some embodiments, a converter in accordance one or more embodiments described herein above may be used to drive a load in the form of a light source, such as a LED light source.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A converter for feeding a load via an inductor with a current having a controlled intensity between a maximum level and a minimum level, the converter comprising:

a switch switchable on and off to permit or prevent, respectively, feeding of current towards said inductor, a first current sensor sensitive to the current flowing through said switch when said switch is on, a second current sensor sensitive to the current flowing through said inductor when said switch is off, comparator circuitry to identify if the current intensity detected by said first current sensor and said second current sensor reaches said maximum level and said minimum level, respectively, by generating respective logical signals, and drive circuitry for said switch sensitive to said logical signals and configured to turn off said switch when the current intensity detected by said first sensor reaches said maximum level and turning on said switch when the current intensity detected by said second current sensor reaches said minimum level.

2. The converter of claim 1, wherein said switch is an electronic switch.

3. The converter of claim 2, wherein said electronic switch is a mosfet.

4. The converter of claim 3, wherein said mosfet is an N type mosfet.

5. The converter of claim 1, wherein said first sensor comprises a resistor traversed by the current flowing through said switch.

6. The converter of claim 1, wherein said second sensor includes a resistor coupled to the converter output, and a further switch is interposed between said switch and said resistor coupled to the converter output, said further switch conductive when said switch is turned off, whereby, with said switch turned off, said resistor coupled to the converter output is traversed by the current flowing through said inductor.

7. The converter of claim 1, further comprising a high level comparator coupled to said first current sensor and having an input coupled with a level shifter, to shift the level of an input signal to the converter representative of said maximum current level.

8. The converter of claim 7, wherein the level shifter is configured in the form of a voltage/current converter.

9. The converter of claim 1, further comprising a low level comparator coupled to said second current sensor having its output coupled with a pulse former, to generate as an output said respective logic level to feed to said drive circuitry.

10. The converter of claim 9, wherein the pulse former is configured in the form of a derivative network.

11. The converter of claim 1, further comprising:

a logical circuit sensitive to said respective logical signals to generate at least one resulting logical output signal, a drive circuit to generate, starting from said at least one resulting logical output signal, a drive signal for said switch.

12. The converter of claim 11, wherein said drive circuit includes:

a pair of current generators alternatively activated by said at least one resulting logical output signal, to turn said switch on and off, respectively, and a current amplifier or buffer driven by said current generators and in turn driving said switch.

13. The converter of claim 12, wherein said current generators drive said current amplifier or buffer via an intermediate amplifier which amplifies the current of one of said current generators.

14. Use of a converter to drive a load in the form of a light source, wherein the converter comprises:

a switch switchable on and off to permit or prevent, respectively, feeding of current towards said inductor, a first current sensor sensitive to the current flowing through said switch when said switch is on, a second current sensor sensitive to the current flowing through said inductor when said switch is off, comparator circuitry to identify if the current intensity detected by said first current sensor and said second current sensor reaches said maximum level and said minimum level, respectively, by generating respective logical signals, and drive circuitry for said switch sensitive to said logical signals and configured to turn off said switch when the current intensity detected by said first sensor reaches said maximum level and turning on said switch when the current intensity detected by said second current sensor reaches said minimum level.

15. Use of a converter as claimed in claim 14, wherein the light source is a LED light source.

* * * * *